United States Patent [19]

Coleman et al.

[11] Patent Number: 4,559,836

[45] Date of Patent: Dec. 24, 1985

[54] PITOT TYPE FLOW MEASURING DEVICE AND METHOD OF MOUNTING

[75] Inventors: Darrel F. Coleman, Longmont; Morris M. Bond, Louisville, both of Colo.

[73] Assignee: Dieterich Standard Corp., Boulder, Colo.

[21] Appl. No.: 661,703

[22] Filed: Oct. 17, 1984

[51] Int. Cl.[4] .............................................. G01F 1/46
[52] U.S. Cl. ................................................. 73/861.66
[58] Field of Search ........... 73/861.65, 861.66, 861.04, 73/863.51, 863.58, 863.61

[56] References Cited

U.S. PATENT DOCUMENTS

| | | | |
|---|---|---|---|
| 1,119,581 | 12/1914 | Dodge | 73/861.66 |
| 1,145,234 | 7/1915 | Dodge | 73/861.66 |
| 1,250,238 | 12/1917 | Spitzglass | 73/861.66 |
| 4,154,100 | 5/1979 | Harbaugh et al. | 73/861.66 |

*Primary Examiner*—Herbert Goldstein
*Attorney, Agent, or Firm*—Edwin L. Spangler, Jr.

[57] ABSTRACT

This invention relates to an improved pitot tube type flow measuring instrument for use in pipes and other conduits characterized by a generally diamond-shaped sensor portion constituting a bluff body for splitting the flow that includes at least a large-radiused leading edge in which three or more impact ports are located, a pair of planar portions diverging rearwardly from the leading edge to a transversely-spaced pair of much shorter-radiused side edges that cooperate therewith and the downstream-facing portion of the bluff body to define flow separation zones capable of stabilizing the flow coefficient over a broad range of flow conditions provided that the distance separating them is at least five times either of their radii. The invention further includes the unique method of mounting the probe in two-phase or multi-phase flowing systems where one of the fluids is a liquid and another a gas that calls for tilting the axis of the sensing portion thereof at an angle to the horizontal such that pools of the liquid are trapped in one end or the other depending upon whether the gaseous constituent is hot or cold.

6 Claims, 4 Drawing Figures

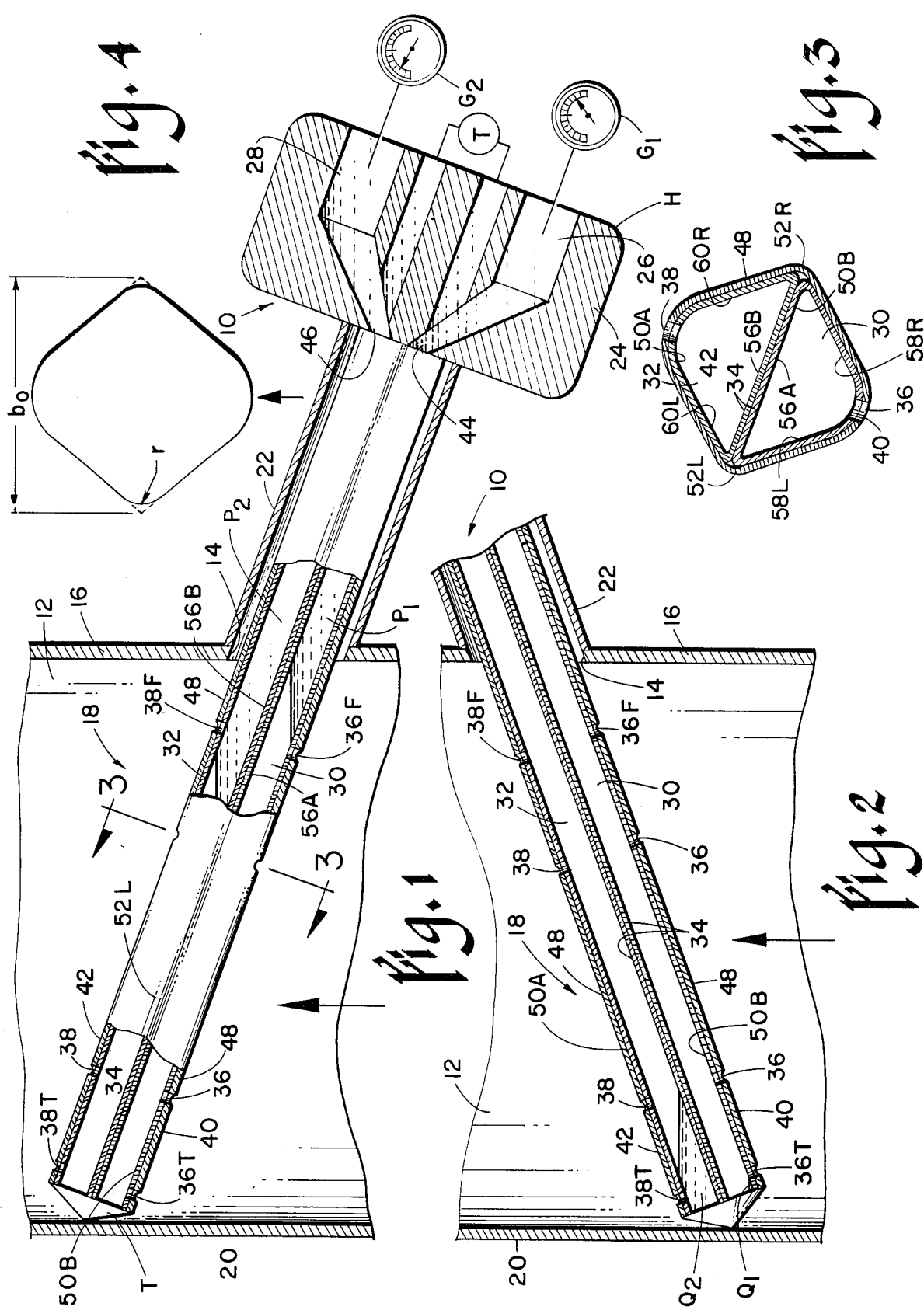

PITOT TYPE FLOW MEASURING DEVICE AND METHOD OF MOUNTING

In U.S. Pat. No. 4,154,100 owned by the assignee of the present application, a pitot tube type flow measuring device was disclosed which had as its most important feature a contoured so-called "bluff body" which split the flow of fluid flowing within a pipe or other conduit and established precise flow separation zones on both sides thereof. By establishing these zones and shaping the body downstream thereof such that the flow could not re-attach thereto over a broad range of flow conditions, the pressure determined by applying a correction factor (flow coefficient) to the differential between the average dynamic fluid pressure sensed by two or more upstream-facing ports and the reference or downstream pressure sensed by other downstream-facing ports in the wake of the fluid flowing around the probe could be much more reliably and accurately determined than from pitot tube type flow meters which were devoid of such features.

Pitot tube type flow meters for measuring fluid flow are widely used and have been for many years, some of the early ones having been patented around the turn of the century. Simple as they seem to be at first glance, the truth is that they are quite complicated and much has yet to be learned about them, how to improve their sensitivity and what can be done to make them more accurate under a wide range of flow conditions. For instance, the ones used to measure fluids, gases and even two-phase flow in a pipe or other conduit must, of necessity, be more complex because of the influence the pipe has on the characteristics of the flow than one, for instance, on the leading edge of an aircraft wing which is subjected to a flowing fluid (air) whose flow characteristics approach those of ideal or perfect laminar flow. Flow in the low pressure regimes has proven to be most difficult to measure accurately because it is in this area that such factors as the misalignment of the upstream-facing holes so that they fail to sense the most important so-called "stagnation pressure" where the fluid has essentially zero velocity or the pressure differential between ports in the probe itself cause a flow of fluid therebetween that is seen as an error in the dynamic pressure reading have their most profound influence. The flow rate of one of the most common of all fluids, namely, steam has been found to be very difficult to determine accurately and pitot tube type probes that produce very adequate results in other fluids, even some two-phase systems, do not work well with steam, at least over extended periods of time.

If, as shown in assignee's U.S. patent referred to previously, the edges of the bluff body perpendicular to the flow are made sharp, the accuracy of the unit is improved as well as the strength of the signal at certain Reynolds Numbers. The reason for the effectiveness of the sharp corners is that when fluid flows around a smooth continuous body it will follow the contours of the body until inertial forces in the fluid cause it to break away from the surface and to flow in a more or less straight line. When the fluid begins breaking away from the surface of the body, however, the differential pressure between the upstream and downstream-facing surfaces changes in a manner unrelated to the velocity of the flow near the body. Therefore, if such a body is used as a flow sensing device, the resulting signal fails to be proportional to flow at certain flow rates. On the other hand, if the fluid is induced by some means such as, for example, sharp edges, to separate from the body at very low velocities, the differential pressure between the upstream and downstream surfaces will remain proportional to the velocity of the flow and thus to the flow rate.

It has recently been discovered, however, that these side edges of the probe do not, in fact, have to be "knife edge sharp", but instead, a relationship exists between their degree of sharpness and the transverse width of the bluff body separating one such side edge from the other which, is observed, will maintain the accuracy of the instrument over essentially its full range of operability and practical use. Applicants have found that this relationship can be expressed as follows:

$$r/b_o < \text{than } 0.2$$

where "r" is the radius of the side edges and $b_o$ is the transverse width of the bluff body, i.e. the distance separating these side edges when r equals zero or these edges are sharp.

Causing the flow to separate from the bluff body along defined lines of separation and not return thereto also produces a fairly uniform low pressure over all of the surface of the probe downstream of the flow separation zones which makes it not as sensitive to orientation and also renders the location of the downstream-facing downstream pressure sensing holes less critical for good accuracy.

In single-phase flow measurement applications, the accepted practice followed by assignee and others has always been one of mounting the sensing portion of the probe which is the part inside the pipe or conduit on, or at least very close to being on, a diameter of the latter, the allowable deviation lying in the range of 5° one way or another. This same practice has been adhered to in two-phase systems in which liquid particles are entrained in a gas; however, applicants have discovered that such an approach is incorrect with respect to multiple-phase systems that include both gaseous and liquid components. As a matter of fact, entirely different mounting criteria must be employed for best results in hot and cold two-phase systems. More specifically, it has now been determined that in hot two-phase systems like, for example, steam lines, the probe is preferably mounted such that its head end containing the readout mechanism should, if at all possible, be mounted at an angle approximately 10° lower than its remote or tail end. This means that in vertically-disposed steam lines, the probe should be tilted upwardly such that its tail end is approximately 10° above its head end, the reason being that the delicate electronics connected to the head end cannot stand temperatures in excess of 180° F. or so and, therefore, by tilting the probe and allowing the upstream- and downstream-facing plenums or chambers to partially fill with water, it functions as an insulating buffer effective to prevent damage to the electronic readout devices. The same holds true of a horizontal line in that the head end of the probe can be located at the nadir of the pipe or up either side something less than about 80°.

Conversely, in cold multi-phase systems like, for instance, trying to measure the flow of wet natural gas issuing from a well at the wellhead when it contains, at one time or another, water, drilling mud, suspended solids, oil and other contaminants, the head end of the probe should be positioned above the tail end so that such contaminants can drain out and the resultant measurement is taken of the gaseous phase alone. Accordingly, the tail end of the probe should, preferably, be tilted down beneath the head by an angle of approximately 10°.

It is, therefore, the principal object of the present invention to provide a novel and improved pitot tube type flow measurement probe for use in confined flow environments that is especially well suited to multi-phase systems in which one of the phases is liquid and another gaseous.

A second objective is the provision of a instrument of the type aforementioned which, in the case of hot liquid-gas phase systems, employs a method of mounting same wherein a small portion of the entrained liquid is trapped and retained inside the upstream- and downstream-facing chambers in a position where the trapped liquid functions as an insulating buffer protecting the delicate readout mechanism in the head from the action of the hot gaseous constituents.

An additional object is to provide a method of mounting such a probe for use in a cold multi-phase environment in which one of the phases is a liquid and another gaseous such that all entrained liquids drain out the tail end and the probe becomes essentially responsive to only the gaseous phase.

Another objective of the invention herein disclosed and claimed is that of providing a probe with a shaped bluff body having flow separation zones on both sides thereof shaped within a range keyed to the distance separating them from one another.

Further objects are to provide a flow measurement probe which is simple, easy to install, accurate at even low flow rates, compact, rugged, versatile, simple to service, inexpensive to manufacture and even somewhat decorative.

Other objects will be in part apparent and in part pointed out specifically hereinafter in connection with the description of the drawings that follows, and in which:

FIG. 1 is a side elevation, portions of which have been broken away and shown in section, detailing the upwardly-tilted orientation of the probe within a vertically-disposed conduit when being used to measure the flow of hot liquid-gas phase constituents;

FIG. 2 is a fragmentary side elevation similar to FIG. 1 and to the same scale but showing the probe tilted donwardly as it would be in the measurement of cold multi-phase systems containing both a liquid and a gas;

FIG. 3 is a section taken along line 3—3 of FIG. 1 to a slightly enlarged scale; and, FIG. 4 is a diagram illustrating the tolerable relationship between the roundness of the flow separation zones on opposite sides of the bluff body in relation to the transverse distance separating them.

Referring next to the drawings for a detailed description of the present invention and, initially, to FIGS. 1, 2 and 3 for this purpose, reference numeral 10 has been selected to broadly designate the flow measurement device of the present invention which will be seen in FIGS. 1 and 2 mounted in the wall of a vertically-disposed large diameter pipe or conduit 12. A hole 14 in the sidewall 16 of the pipe receives what will be referred to herein in a general way as the "sensor portion" 18 of the flow measurement device or "probe" 10 which extends all the way across to the remote sidewall 20 as shown. As will be explained in greater detail presently, the centerline or axis of the sensor 18 intersects the centerline of the pipe 12; however, contrary to traditional perpendicular mounting techniques, it is tilted up or down relative to the latter when used to measure the flow rates of multi-phase systems including both liquid and gaseous components depending on whether they are hot or cold. Any one of several conventional types of mounting hardware represented herein by simple sleeve 22 can be used to attach the probe 10 in proper position with respect to the centerline and sidewalls of the pipe; however, no attempt has been made to illustrate such features in detail since they are well known in the prior art and form no part of the invention. The sensor portion 18 of the probe 10 terminates outside the pipe in a head 24 which contains passage 26 and 28 that connect into its high pressure and the low pressure plenums 30 and 32, respectively. These passages connect, in turn, to conventional instrumentation illustrated schematically in FIG. 1 as high pressure gauge G1 and low pressure gauge G2 for measuring the high and low pressures, respectively, sensed in the plenums as the fluid flows past the sensor portion of the probe lying inside the pipe. A partition wall or divider 34 separates and isolates these two plenums one from the other as is most clearly seen in FIG. 3. Three or more upstream-facing so-called "impact ports" 36 connect the fluid flowing in pipe 12 into the high pressure plenum 30, while other similar "downstream ports" 38 do likewise with respect to the low pressure plenum 32.

In both FIGS. 1 and 2, the fluid flow is upwardly in the direction of the upwardly-directed arrows. This being the case, the upstream-facing impact ports 36 are, of course, in the bottom of the sensor portion 18 opening into the high pressure plenum 30 which lies underneath the low pressure one, 32. Similarly, the downstream ports 38 are on top of the sensor opening into the low pressure plenum therebeneath. In the particular form shown, however, where the arrangement of the ports 36 and 38 is identical on both the upstream and downstream faces of the sensor portion 18 as are the high and lower pressure plenums, the orientation of the probe would remain exactly as shown in both of these figures if the direction of flow were to be reversed, i.e. downwardly instead of upwardly. The functions of the ports and the plenums associated therewith would, obviously, change in that the ports 38 in the top of the sensor portion would become the impact ports while ports 36 underneath would assume the role of the downstream ports. In like manner, plenum 32 would become the high pressure plenum and the other, 30, the low pressure one.

As can be seen most clearly in FIG. 3, the interior of the sensor is divided by partition wall 34 into the two large volume plenums 30 and 32. Similar arrangements have been used by others, an early example being the one shown in Lambert's U.S. Pat. No. 3,751,982. U.S. Pat. Nos. 4,343,195 and 4,425,807 show other versions of the dual plenum sensor. In certain applications where plugging can become a problem, this arrangement is preferred over those sensors which include a so-called "interpolating tube" like those shown in U.S. Pat. Nos. 3,581,565; 3,803,921; and 4,154,100 mentioned before. While these large volume plenums are preferred over interpolating tubes in environments where over an extended period of time the portions of the probe can plug up, they by no means offer a complete solution to the problem since the size of the ports 36 and 38 is equally critical.

In flow measurement, the more precisely the stagnation pressure can be determined, the better the accuracy of the instrument. Since, by definition, stagnation pressure is that point at which the fluid has zero velocity and maximum pressure, it is only reasonable to conclude that the smaller the opening in which the pressure is sensed, the more accurately this point can be located. Unfortunately, this criteria is inconsistent with a system devoid of plugging problems because, obviously, the larger the pressure sensing port, the less susceptible it is to becoming plugged.

Directing the attention next to FIG. 3, it can be seen that applicants— sensor portion 18 employs quite large diameter ports 36 and 38 located in broadly-radiused leading and trailing edges 40 and 42 thereof, respectively. They have determined, quite unexpectedly, that by placing large practically unpluggable openings in the upstream-facing rounded surface, that even though they are mislocated slightly to one side or the other from the stagnation point on the centerline of the probe, they sense pressures which do not differ significantly from the stagnation pressure. On the other hand, placing the same size holes in sharply-contoured leading edges or, for that matter, flat ones oriented more or less perpendicular to the direction of flow, result in pressure readings substantially different from the stagnation pressure if these holes are not located precisely on the centerline of the probe. An equally unexpected benefit derived from providing the upstream-facing leading edge 40 with these gently-rounded contours was the realization that the probe could even be rotated slightly around its axis without moving the upstream-facing impact ports defined by these oversize holes into regions having pressures substantially different from the stagnation pressure. Here again, this was not what happened when holes of the same size were placed in sharply-contoured or essentially planar leading edges. Now, while it is only at the upstream-facing leading edge 40 that the stagnation pressure exists and is to be sensed and measured, in a bi-directional probe like that illustrated which, for all practical purposes, is symmetrical about a transverse centerline, it is best to contour both the upstream-facing leading edge 40 and the downstream-facing trailing edge 42 alike.

Applicants have also discovered that the holes that form the pressure-sensing ports 36 and 38 should be large enough to prevent plugging.

The spacing of the impact ports along the sensor portion 18 of the probe is critical in terms of proper averaging of the pressures sensed at various locations across the pipe; however, this aspect of the unit herein described forms no part of the invention since it follows the well known so-called "Chebyshef" locations developed by others many years ago. Each sensing hole must represent the velocity in a specific area of the pipe or conduit, and the area represented by any one hole must be exactly equal to the area represented by any other hole.

With particular reference once again to FIG. 1, it will be seen that the head end H of the probe is positioned considerably lower than its tail or remote end T. It will also be noted that fluid is trapped in the head end of the probe, some part of which extends out into the sensor portion 18, both in the high pressure plenum 30 and the low pressure one, 32. The fluid level in plenum 30 is, obviously, determined by the location of the upstream-facing impact port 36F just inside the near sidewall 16 of the pipe 14 since any fluid above this level will merely drain out of the latter. In plenum 32, on the other hand, it is the similarly-located downstream-facing reference port 38F that determines the level of fluid in the low pressure chamber defined thereby. The important thing to notice, however, is that the small body of fluid P1 trapped in plenum 30 as well as the separate body thereof P2 trapped in chamber 32 thereabove both cover the entryways 44 and 46 leading into passages 26 and 28, respectively, due to the upward tilt of the probe. It is this mounting method that is employed for two-phase or multi-phase systems containing a liquid along with one or more hot gaseous constituents like, for example, wet or dry steam. By tilting the probe such that the liquid phase forms the insulating barriers P1 and P2 that protects the delicate instrumentation (G1 and G2) from the direct action of the hot vapor, no harm comes to the latter. It has been found that an upward tilt of approximately 10° will be sufficient in most hot liquid-gas phase applications to isolate the instrumentation from the direct action of the hot vapor. FIG. 1 shows an upward tilt of around 20° primarily for illustrative emphasis since the minimum tilt angle sufficient to insure that the fluid pools are forming the insulation barrier isolating the instrumentation from the action of the hot gas is probably the best. Temperaturewise, the mounting technique shown in FIG. 1 should be used whenever the vapors approach approximately 180° F. or so above which damage has been known to occur.

Certain other points should be mentioned in connection with the hot liquid-gas mounting of the probe shown in FIG. 1. First of all, it makes no difference whether the flow is upward as shown or downward, the exact same entrapment of the fluid bodies P1 and P2 will eventually occur. In the case of downward flow, the system may need to be primed with fluid to create the body P1 in what would be the downstream-facing low pressure plenum or chamber 30 since it lies in the wake of the fluid flowing around the bluff body and, therefore, no fluid would be reaching it directly. On the other hand, condensation will eventually result in fluid collecting in this chamber even without it being primed. Now, it is necessary that both of these bodies of fluid be present when the instrumentation is calibrated because, for all practical purposes, they will exist at all times during normal operation and will vary little, if any, in size.

Something should, perhaps, be said about what would happen in the case of superheated steam or the like where there is very little of the liquid phase present. In this situation, as with wet steam, a certain portion of whatever liquid is available will eventually condense out and form the puddles P1 and P2. There will be a difference, however, and it will be that the superheated vapor will constantly be evaporating part of the entrapped liquid thus lowering the level of the puddles P1 and P2 by some amount. Eventually an equilibrium will be reached at a given set of operating conditions and, when this occurs, the instruments can be calibrated accordingly.

FIG. 2 represents the opposite situation from that of FIG. 1 in that the liquid-gas system is now cold instead of hot. As such, there is no reason to protect and isolate the instrumentation from direct access to the gaseous phase which, in this instance, is not harmful. Quite the contrary, direct access to the instrumentation should be assured and this is accomplished as shown by tilting the probe downwardly such that the liquid pools Q1 and Q2 form in the tail end of the probe. The level of these pools of fluid are, like P1 and P2 determined by the location of tail end ports 36T and 38T. These pools $Q_1$ and $Q_2$ do not affect instrument calibration.

As was the case with the hot liquid-gas mounting method forming the subject matter of FIG. 1, the downward tilt angle shown in FIG. 2 has been exaggerated for illustrative purposes and, as a matter of fact, the system would function quite satisfactorily if the degree of tilt were somewhat approximating half that shown. Quite obviously, the amount of fluid retained in the lower chamber 30 below impact port 36T at the angle of downward tilt found in FIG. 2 would be but a few drops.

Finally, before going on to FIG. 3, some mention should be made of what method is used in mounting the probe in other than vertical runs of pipe as far as the liquid-gas two or multiple-phase systems are concerned. Actually, the mounting technique in, for example, a horizontal run of pipe becomes much simpler in both the hot and cold multi-phase situations since the axis or centerline of the probe can be placed upon a diameter of the pipe rather that being tilted up or down relative thereto. Specifically in the case of the hot liquid-gas system, in a horizontal run of pipe the axis of the probe should be placed as nearly as possible in a vertical plane such that its head end is at least 10° lower than its tail end. Looking at this another way, its head end can be moved up in either direction from the nadir of the pipe through an angle on anything less than approximately 80°. Simpler yet is the cold liquid-gas situation since, because the head must be above the tail end anyway, it is easiest to mount the probe just as it would be mounted in a single-phase system, i.e. with its axis coincident with a vertically-disposed diameter of the pipe. It could, of course, be tilted to one side or the other so long as its head remained at least 10° or so above its tail end but to do so unnecessarily complicates the mounting procedure unless some other reason exists for doing so such as, for example, space limitations.

Referring next to FIG. 3, it can be seen that in the particular form shown, the sensor portion 18 of the probe is made up of an outer tubular sleeve or sheath 48 into which is inserted a pair of substantially identical smaller tubular inserts 50A and 50B. The sheath 48 is shown to be generally square in cross section with the inserts having the shape of isosceles triangles. The leading and trailing edges of the sheath 40 and 42 are preferably radiused as previously described as are the side edges 52R and 52L which form the flow separation zones soon to be described in connection with FIG. 4, but to a lesser degree. The bases 56A and 56B of the triangular inserts cooperate to define partition wall 34 while the legs 58R, 58L, 60R and 60L thereof abut the inside walls of the sheath in close-fitting face-to-face relation as shown. Inserts with other than the triangular shape shown can also be used such as, for example, rectangular ones which would place the partition wall 34 in position bisecting the square sheath midway between its corners rather than on a diagonal. Wherever the partition wall is located, it must isolate the pressures in the two chambers from one another. Preferably, of course, they should both be as large as can be accommodated within the confines of the sheath but they need not necessarily be either the same size or the same shape. Simplicity of manufacture and making the unit bi-directional suggest, however, that a symmetrical configuration of some sort be adopted as shown.

Lastly, looking at the diagram of FIG. 4, it will be observed that the side edges (52R and 52L in FIG. 3) of the sensor portion 18 which constitutes the bluff body that separates the flow are slightly radiused, such radius having been designated by the letter "r". The distance separating these side edges or flow separation zones has been referred to as "$b_o$" and has been defined previously. Applicants have discovered that, while sharply-contoured side edges produce the most clearly-defined flow separation zones, they are not a necessity since virtually no lessening in the accuracy of the pressures sensed by the instrument or any significant reduction in the strength of the signal can be detected when the ratio defined by dividing the radius of these flow separation zones "r" by the distance "$b_o$" separating same does not exceed a value of 0.2. By having this degree of latitude in the sharpness required in these flow separation zones, expensive machining and finishing operations are avoided and simple roll-forming techniques using deformable tube stock can be substituted therefor at great reductions in cost.

What is claimed is:

1. In a pitot tube type flow measuring device of the type having a tubular body of other than circular cross section with a head on one end and a closed tail end on the other, means for attaching same to a pipe such that the tail end thereof is impacted by a fluid flowing inside the pipe and the head end lies outside, a partition wall extending lengthwise of said body dividing its interior into two isolated plenums, a separate passage in the head end connected into each of the plenums and connectable to externally-located instrumentation for indicating the pressure in the latter, at least one port opening into each of the plenums spaced along that portion of the body that will be located within the stream of flowing fluid, one of said ports being positionable to face upstream and be impacted by the flowing fluid, and the other of said ports facing downstream and lying in the wake of the fluid flowing past the body, the improvement which comprises: the upstream-facing portion of the body impacted by the flowing fluid is shaped to include a convex rounded leading edge separating a pair of substantially planar portions diverging therefrom in a downstream direction that terminate in a pair of transversely-spaced substantially parallel side margins cooperating with one another to define flow separation zones effective to separate the fluid flowing thereover from said body, the upstream-facing ports are located in said leading edge, and said side margins are convexly curved about radii of a length no greater than 1/5th of the transverse distance therebetween.

2. The pitot tube type flow measuring device as set forth in claim 1 wherein: the leading edge has a radius of curvature and it is substantially greater than the radii of curvature of said side margins.

3. The pitot tube type flow measuring device as set forth in claim 1 wherein: the cross section of the body is generally diamond-shaped, the body includes a downstream-facing portion having a convex rounded trailing edge, and wherein a second pair of substantially planar portions extend upstream in divergent relation interconnecting said trailing edge to the radiused side margins on both sides thereof.

4. The improved method for mounting a pitot tube type flow measuring device in a two-phase or a multi-phase flowing stream containing both liquid and gaseous constituents wherein said measuring device is of the type having a tubular body, a partition wall extending the length thereof dividing its interior into two isolated plenums, sets of three or more ports in the body spaced along the length thereof opening into each of said plenums, a head on one end containing passages connected into each of said plenums connectable to pressure measurement instrumentation, and a closed tail end opposite its head end, which comprises: placing one of said head and tail ends in an elevated position above the other at an angle of 10° or greater but less than 90° such that puddles of liquid are trapped in each of the plenums.

5. The method as set forth in claim 4 wherein: when measuring the flow rate of a cold system containing a gaseous constituent at a temperature less than that which could damage the instrumentation, the head end is elevated above the tail end by an amount such that the fluid trapped in the lower end of the plenums leaves said passages leading to said pressure measurement instrumentation uncovered and directly accessible to said cold gas.

6. The method as set forth in claim 4 wherein: when measuring the flow rate of a hot system in which the gaseous constituent is at a temperature sufficient to damage the instrumentation, the tail end is elevated above the head end by an amount such that the liquid trapped in the plenums covers said passages leading to said instrumentation so as to provide an insulating barrier between the latter and said hot gas.

* * * * *